(12) United States Patent
Ohyama

(10) Patent No.: US 9,344,971 B2
(45) Date of Patent: May 17, 2016

(54) APPARATUS AND METHOD FOR CONTROLLING TRANSMIT POWER IN A MOBILE COMMUNICATION SYSTEM

(71) Applicant: FUJITSU LIMITED, Kawasaki-shi, Kanagawa (JP)

(72) Inventor: Junichi Ohyama, Tagajou (JP)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 13/926,682

(22) Filed: Jun. 25, 2013

(65) Prior Publication Data

US 2014/0045544 A1 Feb. 13, 2014

(30) Foreign Application Priority Data

Aug. 7, 2012 (JP) .................................. 2012-175288

(51) Int. Cl.
*H04W 52/14* (2009.01)
*H04W 52/22* (2009.01)

(52) U.S. Cl.
CPC .......... *H04W 52/146* (2013.01); *H04W 52/226* (2013.01); *H04W 52/228* (2013.01)

(58) Field of Classification Search
CPC ............ H04W 52/146; H04W 52/226; H04W 52/228; H04W 52/14
See application file for complete search history.

(56) References Cited

U.S. PATENT DOCUMENTS

| | | | | |
|---|---|---|---|---|
| 2005/0286624 | A1* | 12/2005 | Park | 375/232 |
| 2006/0035660 | A1* | 2/2006 | Anderson | 455/522 |
| 2008/0159184 | A1* | 7/2008 | Niwano | 370/278 |
| 2010/0074227 | A1* | 3/2010 | Boncz et al. | 370/331 |
| 2011/0143805 | A1* | 6/2011 | Ramasamy et al. | 455/522 |

FOREIGN PATENT DOCUMENTS

| | | |
|---|---|---|
| JP | 09-284215 A | 10/1997 |
| JP | 2001-217774 A | 8/2001 |
| JP | 2006-186757 A | 7/2006 |
| JP | 2012-060483 A | 3/2012 |

OTHER PUBLICATIONS

Office Action of Japanese Patent Application No. 2012-175288 dated Feb. 23, 2016 with partial translation.

* cited by examiner

*Primary Examiner* — Wesley Kim
*Assistant Examiner* — Dong-Chang Shiue
(74) *Attorney, Agent, or Firm* — Arent Fox LLP

(57) ABSTRACT

In a mobile communication system, an apparatus acquires a first variant amount by which to vary uplink transmit power as requested by a base station, based on a control command issued from the base station. The apparatus controls the uplink transmit power using a second variation amount smaller than the first variant amount when accumulated uplink transmit power obtained by accumulating the first variation amount satisfies a suppression condition for adjusting the uplink transmit power to be outputted.

12 Claims, 10 Drawing Sheets

FIG. 6

| TA CONTROL VALUE | REFERENCE VALUE | NOTE |
|---|---|---|
| 0 – 2564 | −25 dBm | (SIDE CLOSER TO BASE STATION) |
| 2565 – 5128 | −20 dBm | |
| 5129 – 7692 | −15 dBm | |
| 7693 – 10256 | −10 dBm | |
| 10257 – 12820 | 5 dBm | |
| 12821 – 15384 | 0 dBm | |
| 15385 – 17948 | +5 dBm | |
| 17949 – 20512 | +10 dBm | (SIDE FARTHER FROM BASE STATION) |

APPARATUS AND METHOD FOR CONTROLLING TRANSMIT POWER IN A MOBILE COMMUNICATION SYSTEM

CROSS-REFERENCE TO RELATED APPLICATION

This application is based upon and claims the benefit of priority of the prior Japanese Patent Application No. 2012-175288, filed on Aug. 7, 2012, the entire contents of which are incorporated herein by reference.

FIELD

The embodiments discussed herein are related to apparatus and method for controlling transmit power in a mobile communication system.

BACKGROUND

FIG. 1 is a diagram illustrating an example of transmit power control in a mobile communication system. In the mobile communication system, a mobile station 1 controls transmit power to be used to transmit data through an uplink (UL) channel (hereinafter, referred to as "UL transmit power"). A base station 2 receives the data transmitted from the mobile station 1 and detects a reception level thereof via a reception level detecting unit 2a. Then, when the base station 2 determines that the detected reception level is low, the base station 2 sends a command to the mobile station 1 to raise the UL transmit power, via a downlink control channel by a transmit power control (TPC) inserting unit 2b. On the other hand, when the base station 2 determines that the detected reception level is high, the base station 2 sends a command to the mobile station 1 to lower the UL transmit power, via the downlink control channel by the TPC inserting unit 2b. A UL transmit power control command includes a TPC value.

The mobile station 1 receives a command sent from the base station 2 for requesting control of the UL transmit power. Then, a TPC extracting unit 1a of the mobile station 1 extracts a TPC value from the received command requesting control of the UL transmit power. Thereafter, a transmit power control unit 1b controls a UL transmit power value in accordance with the extracted TPC value.

FIG. 2 is a diagram illustrating an example of a transmit power control unit. A TPC value conversion unit 3 converts a TPC value supplied from the TPC extracting unit 1a into a decibel value and supplies the decibel value to a cumulative addition unit 4. The cumulative addition unit 4 then adds an output value from the TPC value conversion unit 3 to a transmit power value of a previous output to obtain an increased or decreased transmit power value. The increased or decreased transmit power value outputted from the cumulative addition unit 4 is added to an initial power value in an addition unit 5, and the result is then outputted as the transmit power value. Note that an up or down range of the transmit power set through a TPC value may be an arbitrary fixed value.

In a mobile communication system, data is handled per frame, which is a time unit. When data is to be exchanged, the data is transmitted or received using sub-frames into which data for a single frame is divided. Thus, a mobile station controls the UL transmit power value on a sub-frame-by-sub-frame basis.

In UL transmit power control in mobile communication systems, a mobile station, upon receiving a UL transmit power control command from a base station, controls the transmit power in accordance with the specified TPC value. However, when the condition of the transmission path from the base station is bad, there are cases where the mobile station mistakenly receives a UL transmit power control command sent from the base station or the base station sends out a wrong command.

In such a case, the mobile station may receive a UL transmit power control command requesting raising of the transmit power even though the mobile station is in a state where the transmit power is supposed to be lowered. In this case, such transmit power control leads to excess transmit power, which in turn may lead to an increase in consumed power at the mobile station, interference with a signal from another mobile station at the base station, and so on.

Here, a technique has been disclosed in which, when a mobile station receives commands to raise the transmit power by an excessive amount, the mobile station carries out mask processing for ignoring UL transmit power control commands from the base station (see, for example, Japanese Laid-open Patent Publication No. 2006-186757). In addition, a technique in which a time alignment (TA) value is used as information indicating the distance between a mobile station and a base station has been disclosed (see, for example, Japanese Laid-open Patent Publication No. 09-284215). Furthermore, a technique has been disclosed in which a table is created by obtaining the maximum transmit power for a distance from each mobile station and the distance from a mobile station is measured on the basis of a difference between a reception timing signal and a reference timing (see, for example, Japanese Laid-open Patent Publication No. 2001-217774).

SUMMARY

According to an aspect of the invention, there is provided an apparatus in a mobile communication system. The apparatus acquires a first variant amount by which to vary uplink transmit power as requested by a base station, based on a control command issued from the base station. The apparatus controls the uplink transmit power using a second variation amount smaller than the first variant amount when accumulated uplink transmit power obtained by accumulating the first variation amount satisfies a suppression condition for adjusting the uplink transmit power to be outputted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a reference value table, according to an embodiment;

DESCRIPTION OF EMBODIMENTS

In an existing transmit power control in a mobile station in a wireless communication system, suppression of excessive transmit power control is not sufficient when dealing with an instruction from the base station for controlling a transmit power control value. For example, with the technique disclosed in Japanese Laid-open Patent Publication No. 2006-186757, the mobile station carries out processing to determine a transmit power value by raising or lowering the transmit power unlimitedly in response to the instruction from the base station for controlling the transmit power control value until the mobile station detects that the commands to raise the transmit power have been received in excess. In other words, unnecessary excessive transmit power control is carried out until such an excess is detected, causing a problem that consumed power at the mobile station increases, interference with another mobile station occurs at the base station, and so on.

Hereinafter, embodiments will be described with reference to the drawings.

<Relationship Between Base Station and Mobile Communication Terminal Apparatus>

Figure 1:
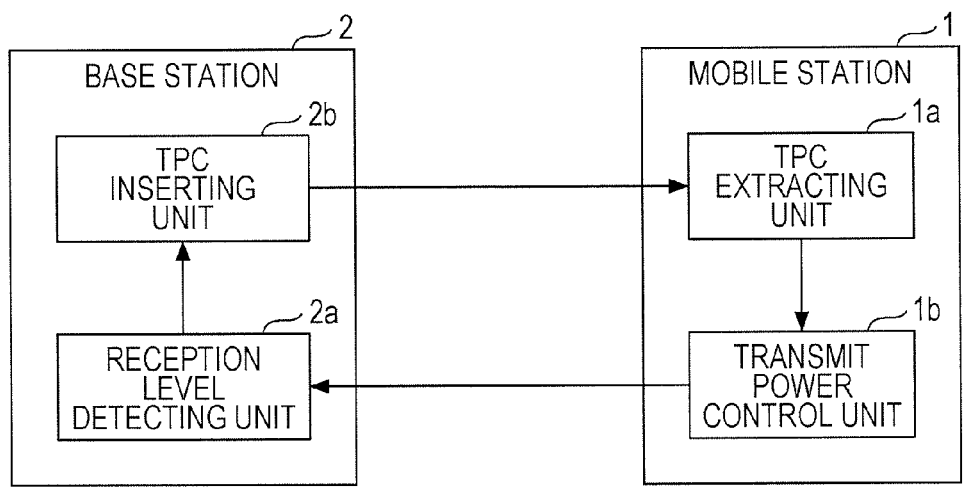
FIG. 1 is a schematic diagram illustrating an example of transmit power control in a mobile communication system.
Figure 2:
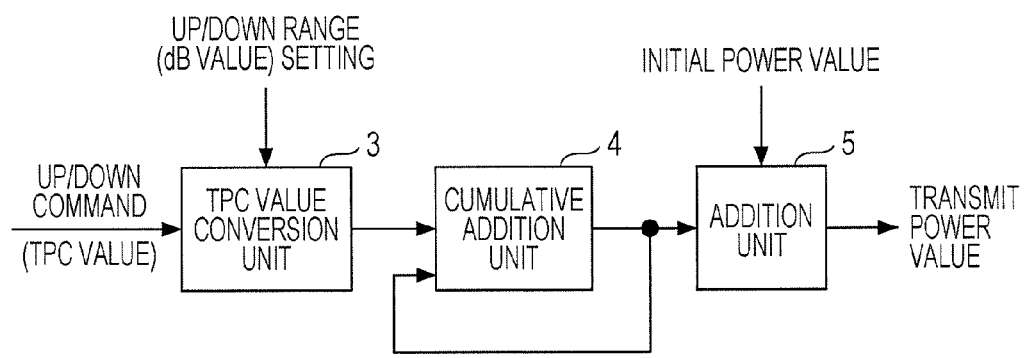
FIG. 2 is a diagram illustrating an example of a transmit power control unit.
Figure 3:
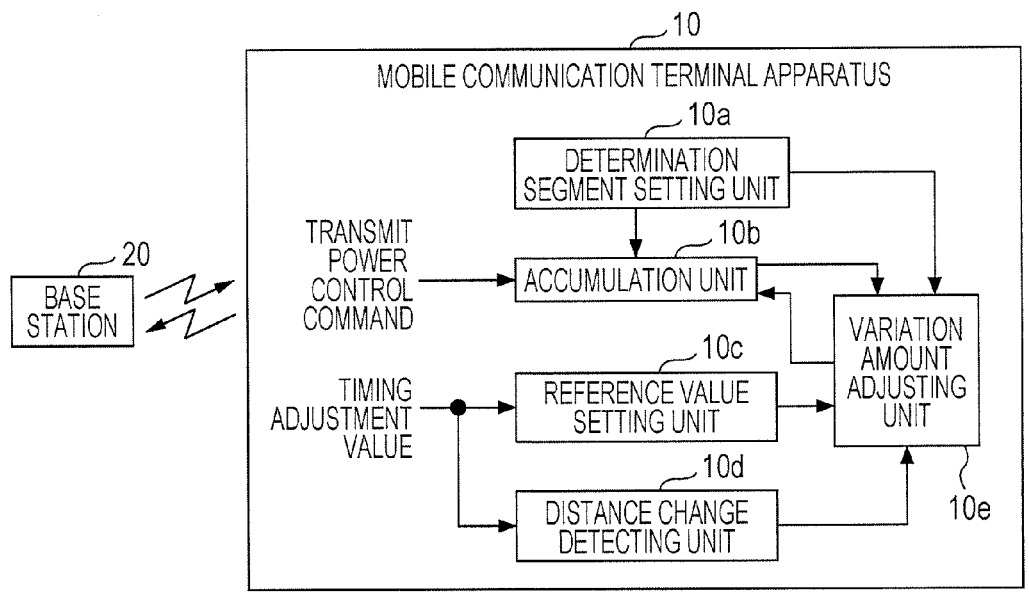
FIG. 3 is a schematic diagram illustrating an example of transmit power control in a mobile communication system, according to an embodiment.

FIG. 3 is a schematic diagram illustrating an example of transmit power control in a mobile communication system, according to an embodiment. As illustrated in FIG. 3, a mobile communication terminal apparatus 10 serving as a mobile station exchanges data packets with a base station 20 through wireless communication. The mobile communication terminal apparatus 10 receives a wireless signal transmitted from the base station 20. The base station 20 receives a wireless signal transmitted from the mobile communication terminal apparatus 10. The exchange of data packets between the mobile communication terminal apparatus 10 and the base station 20 is carried out in each frame cycle. Further, the mobile communication terminal apparatus 10 and the base station 20 exchange data packets with each other on a sub-frame-by-sub-frame basis. Here, sub-frames are obtained by dividing a frame into a certain number of sub-frames.

The base station 20 transmits a transmit power control command to the mobile communication terminal apparatus 10 in each sub-frame, where the transmit power control command includes a TPC value indicating a variation amount by which the transmit power is to be varied.

Furthermore, the base station 20 transmits a transmission timing control command to adjust the timing at which the mobile communication terminal apparatus 10 transmits a signal to the base station 20. The base station 20 gives an instruction to the mobile communication terminal apparatus 10 for timing advance (TA) control using TA information that is the aforementioned transmission timing control command. The transmission timing control command includes a TA control value for requesting advancement or delay of a transmission timing. In TA control, the base station 20 issues TA information when an uplink transmission timing of the mobile communication terminal apparatus 10 is to be advanced, that is, when the distance between the base station 20 and the mobile communication terminal apparatus 10 has increased, or when the uplink transmission timing is to be delayed, that is, when the distance between the base station 20 and the mobile communication terminal apparatus 10 has decreased. For example, see the standard specification 3GPP TS 36.213 of the standards organization 3rd Generation Partnership Project (3GPP).

The mobile communication terminal apparatus 10 receives a transmit power control command and a transmission timing control command from the base station 20. Then, the mobile communication terminal apparatus 10 calculates a transmit power value using the received transmit power control command and transmission timing control command and transmits data at the calculated transmit power value, as will be described later.

In the mobile communication terminal apparatus 10, a determination segment setting unit 10*a* sets a determination segment of a certain period of time. An accumulation unit 10*b* accumulates, within the determination segment, a variation amount by which to vary transmit power in accordance with a transmit power control command transmitted from the base station 20. A reference value setting unit 10*c* receives, from the base station 20, a timing adjustment value for controlling the timing of transmission of a signal and sets a reference value for determining excessive transmit power control in accordance with the timing adjustment value. A distance change detecting unit 10*d* detects a change in the distance from the base station 20 where the distance is obtained based on the timing adjustment value.

A variation amount adjusting unit 10*e* makes an adjustment to change a variation amount by which to vary transmit power in accordance with a transmit power control command, to a smaller amount when a cumulative value of the variation amount by which to vary the transmit power within a determination segment exceeds a pre-set cumulative threshold value, a transmit power value exceeds a reference value, and a change in the distance from the base station 20 indicates that the distance from the base station 20 is decreasing. Then, the mobile communication terminal apparatus 10 controls the transmit power in accordance with the cumulative value of the variation amount that has been adjusted by the variation amount adjusting unit 10*e*.

<Configuration of Mobile Communication Terminal Apparatus>

Figure 4:
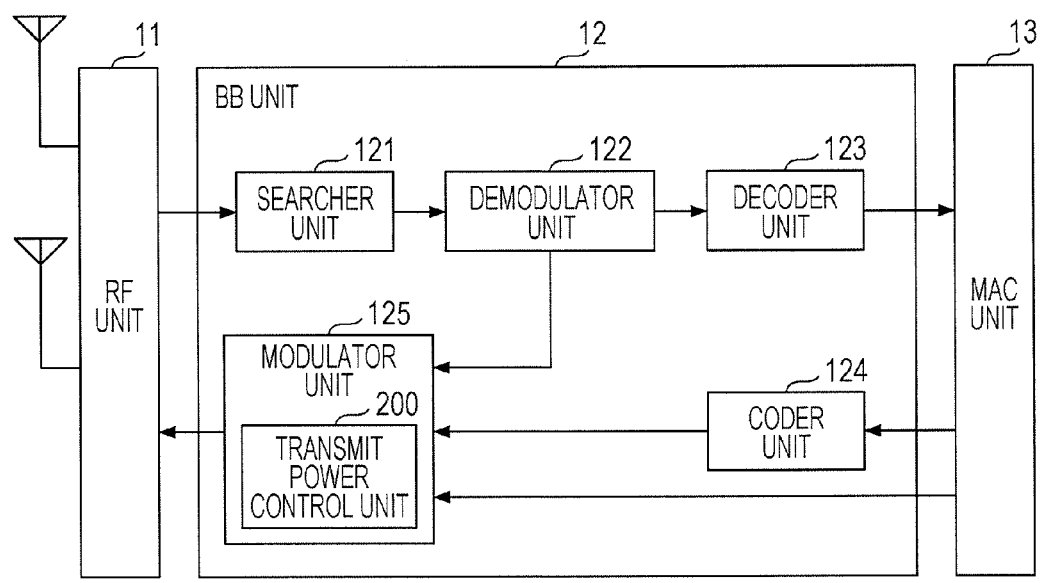
FIG. 4 is a diagram illustrating a configuration example of a mobile communication terminal apparatus, according to an embodiment.

FIG. 4 is a diagram illustrating a configuration example of a mobile communication terminal apparatus, according to an embodiment. With reference to FIG. 4, the mobile communication terminal apparatus 10 includes a radio frequency (RF) unit 11, a baseband (BB) unit 12, and a medium access control (MAC) unit 13.

The RF unit 11 receives a wireless signal transmitted from the base station 20 via an antenna. Then, the RF unit 11 downconverts the wireless signal to a baseband signal and supplies the downconverted baseband signal to the BB unit 12. In addition, the RF unit 11 is supplied with an input of a baseband signal from the BB unit 12. Then, the RF unit 11 upconverts the received baseband signal to a wireless signal. In addition, the RF unit 11 is supplied with an input of a transmit power value from the BB unit 12. Then, the RF unit 11 transmits the upconverted wireless signal to the base station 20 at the received transmit power value via the antenna.

The BB unit 12 includes a searcher unit 121, a demodulator unit 122, a decoder unit 123, a coder unit 124, and a modulator unit 125.

The searcher unit 121 is supplied with an input of a baseband signal from the RF unit 11. Then, the searcher unit 121 identifies the base station 20 using the received baseband signal. In addition, the searcher unit 121 detects a path and a path timing using the received baseband signal. Then, the searcher unit 121 supplies the baseband signal to the demodulator unit 122.

The demodulator unit 122 is supplied with an input of a baseband signal from the searcher unit 121. Then, the demodulator unit 122 demodulates the received baseband signal. Thereafter, the demodulator unit 122 supplies the demodulated baseband signal to the decoder unit 123. In addition, the demodulator unit 122 obtains a transmit power control command from the received baseband signal and supplies the transmit power control command to the modulator unit 125.

The decoder unit 123 is supplied with an input of a coded baseband signal from the demodulator unit 122. Then, the decoder unit 123 carries out decoding processing on the received baseband signal. Thereafter, the decoder unit 123 supplies the decoded baseband signal to the MAC unit 13.

The coder unit 124 is supplied, from the MAC unit 13, with a baseband signal of data to be transmitted to the base station 20. Then, the coder unit 124 carries out coding processing on the received baseband signal. Thereafter, the coder unit 124 supplies the coded baseband signal to the modulator unit 125.

The modulator unit 125 includes a transmit power control unit 200. The modulator unit 125 is supplied, from the demodulator unit 122, with an input of a transmit power control command transmitted from the base station 20. In addition, the modulator unit 125 is supplied, from the MAC unit 13, with a timing control signal that contains a transmission timing control command transmitted from the base station 20.

Furthermore, the modulator unit 125 is supplied, from the coder unit 124, with a baseband signal of data to be transmitted to the base station 20. Then, the modulator unit 125 modulates the received baseband signal. Thereafter, the modulator unit 125 adjusts the timing of transmission of a signal using the received timing control signal and then supplies the modulated baseband signal to the RF unit 11.

The transmit power control unit 200 calculates a transmit power value from the transmit power control command and the transmission timing control command that have been received from the base station 20. Then, the modulator unit 125 supplies the transmit power value which the transmit power control unit 200 has calculated to the RF unit 11.

The MAC unit 13 carries out processing such as a protocol analysis of a MAC header or the like, which pertains to a MAC layer between the mobile communication terminal apparatus 10 and the base station 20. The MAC unit 13 is supplied with a baseband signal from the decoder unit 123. Then, the MAC unit 13 carries out the processing pertaining to the MAC layer on the received baseband signal and provides the result to an operator. In addition, the MAC unit 13 obtains a timing control signal that contains a transmission timing control command from the received baseband signal and supplies the timing control signal to the modulator unit 125.

Furthermore, the MAC unit 13 obtains transmission data which an operator has inputted. Then, the MAC unit 13 carries out the processing pertaining to the MAC layer on the obtained transmission data to generate a baseband signal and supplies the generated baseband signal to the coder unit 124.

<Configuration of Transmit Power Control Unit>

Figure 5:
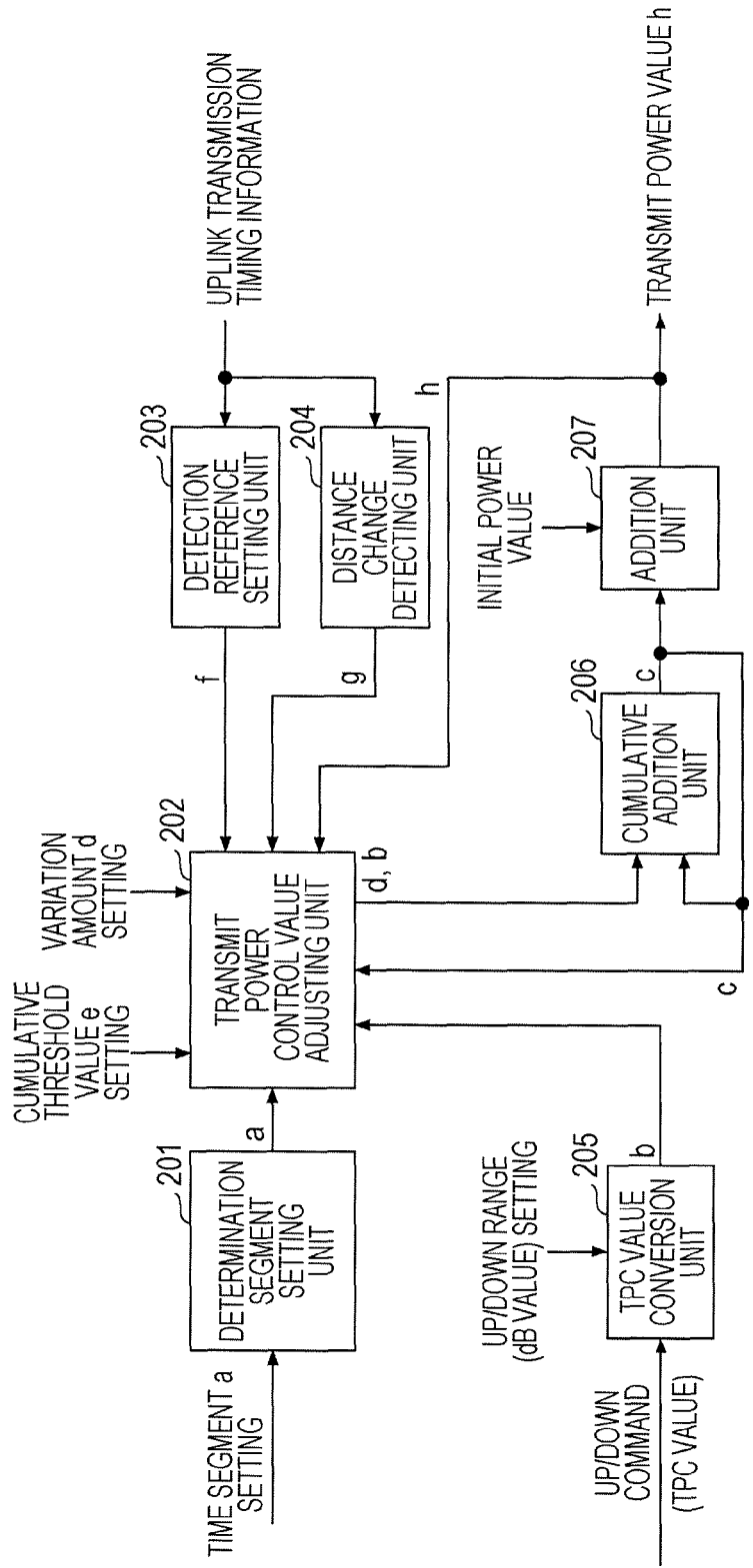
FIG. 5 is a diagram illustrating a configuration example of a transmit power control unit, according to an embodiment.

FIG. 5 is a diagram illustrating a configuration example of a transmit power control unit, according to an embodiment. In FIG. 5, a determination segment setting unit 201 of the transmit power control unit 200 generates a determination segment a by controlling a counter based on the setting of a time segment that is held in advance in a register or the like and sets the determination segment a in a transmit power control value adjusting unit 202. The determination segment a is a time segment for determining excessive transmit power control from the base station 20. A determination segment synchronizes with sub-frames and is a time segment that corresponds to, for example, a few sub-frames to a few tens of sub-frames.

A detection reference setting unit 203 determines a reference value f for detecting excessive transmit power control in accordance with uplink transmission timing information (TA information) supplied from the MAC unit 13 and sets the determined reference value f in the transmit power control value adjusting unit 202. In order to determine the reference value f, the detection reference setting unit 203 holds in advance a table of reference values corresponding to uplink transmission timing information indicating a distance from the base station 20. The detection reference setting unit 203 reads out a reference value f from the reference value table using the uplink transmission timing information. Note that the reference value table is configured to be stored in a memory.

FIG. 6 is a diagram illustrating an example of a reference value table, according to an embodiment. In the reference value table, TA control values (that is, uplink transmission timing information) are arranged in ascending order. The minimum TA control value range is from 0 to 2564, and the maximum TA control value range is from 17949 to 20512. Here, the mobile communication terminal apparatus 10 carries out control for advancing transmission timing as the TA control value increases. In other words, the greater the TA control value is, the farther the mobile communication terminal apparatus 10 is from the base station 20. That is, the reference value table indicates that the distance between the mobile communication terminal apparatus 10 and the base station 20 increases with increasing TA control value.

When the distance between the mobile communication terminal apparatus 10 and the base station 20 is large, a larger output is required and thus the transmit power value becomes higher. Therefore, even if the transmit power value is high to some extent, it is not necessarily excessively high. Accordingly, when the distance between the mobile communication terminal apparatus 10 and the base station 20 is large, the reference value is set higher. On the other hand, when the distance between the mobile communication terminal apparatus 10 and the base station 20 is small, a small output is sufficient and thus the transmit power value is kept low. Therefore, there may be a case where even if the transmit power value is low in comparison with the case where the distance between the mobile communication terminal apparatus 10 and the base station 20 is large, the transmit power is excessive. Accordingly, when the distance between the mobile communication terminal apparatus 10 and the base station 20 is small, the reference value is set low.

Here, a reference value of −25 dBm corresponds to the minimum TA control value range. In addition, a reference value of +10 dBm corresponds to the maximum TA control value range. That is, as a TA control value decreases, or in other words, as a distance between the mobile communication terminal apparatus 10 and the base station 20 decreases, the reference value corresponding to the TA control value decreases. On the other hand, as a TA control value increases, or in other words, as a distance between the mobile communication terminal apparatus 10 and the base station 20 increases, the reference value corresponding to the TA control value increases. Note that the reference value table may be configured so that corresponding TA control values and reference values are modified in response to an input from an operator.

A distance change detecting unit 204 monitors a change in the uplink transmission timing information supplied from the MAC unit 13 to detect a change in the distance from the base station 20 to the mobile communication terminal apparatus 10 and sets the detected distance change information g in the transmit power control value adjusting unit 202. An increase in the TA control value indicates that the distance from the base station 20 to the mobile communication terminal apparatus 10 is increasing, and a decrease in the TA control value indicates that the distance from the base station 20 to the mobile communication terminal apparatus 10 is decreasing.

A TPC value conversion unit 205 extracts a TPC value from a transmit power control command that is inputted in each sub-frame from the demodulator unit 122 and converts the TPC value into a first variation amount (decibel value) b by which to vary the transmit power as requested by the base station 20. Thus, the TPC value conversion unit 205 stores, in a memory or the like, a variation amount calculation table that indicates a correspondence relationship between a TPC value and a variation amount. The TPC value conversion unit 205 supplies the converted first variation amount b by which to vary the transmit power to the transmit power control value adjusting unit 202.

The transmit power control value adjusting unit 202 has a cumulative threshold value e and a second variation amount d, by which to actually vary the transmit power, set in a register or the like in advance. As the second variation amount d by which to actually vary the transmit power, a value of, for example, 0.5 dBm, 0.25 dBm, or so is set. The value of the second variation amount d is not particularly limited as long as that value is smaller than any first variation amount b to be specified by the base station 20. Further, the second variation amount d may, for example, be set at a value corresponding to a certain ratio (for example, 10%) of the first variation amount b. Each of the cumulative threshold value e and the second variation amount d may be configured to be modified in response to an input from an operator or the like.

The transmit power control value adjusting unit 202 determines whether or not transmit power control based on the first variation amount b by which to vary the transmit power as requested by the base station 20 is excessive transmit power control within a determination segment a set by the determination segment setting unit 201. Specifically, the transmit power control value adjusting unit 202 monitors a cumulative value c of variation amounts supplied from a cumulative addition unit 206. The transmit power control value adjusting unit 202 determines that there is excessive transmit power control, which may have resulted from the mobile communication terminal apparatus 10 mistakenly receiving a wrong transmit power control command transmitted from the base station 20 or the base station 20 transmitting a wrong command, when the cumulative value c exceeds the pre-set cumulative threshold value e, a transmit power value h supplied from an addition unit 207 exceeds the reference value f set by the detection reference setting unit 203, and the distance change information g set by the distance change detecting unit 204 indicates that the distance from the base station 20 is decreasing. Then, when the transmit power control value adjusting unit 202 determines that there is excessive transmit power control, the transmit power control value adjusting unit 202 changes the currently-used variation amount from the first variation amount b causing the excess transmit power, to a transmit power control value of the pre-set smaller second variation amount d (d<b) and supplies the changed second variation amount d to the cumulative addition unit 206.

The transmit power control value adjusting unit 202 supplies, without any change, the first variation amount b by which to vary the transmit power as requested by the base station 20, to the cumulative addition unit 206, when the cumulative value c does not exceed the cumulative threshold value e, the transmit power value h does not exceed the reference value f, or the distance change information g indicates that the distance from the base station 20 is not decreasing.

The cumulative addition unit 206 adds the first variation amount b or the second variation amount d that is supplied from the transmit power control value adjusting unit 202 to a cumulative value c that has been outputted and fed back in a previous sub-frame and supplies the result to the addition unit 207 as a cumulative value c of the current instance. Further, the cumulative addition unit 206 also supplies the cumulative value c of the current instance, which is to be supplied to the addition unit 207, to the transmit power control value adjusting unit 202.

The addition unit 207 has an initial power value set in advance in a register or the like and calculates a transmit power value h by adding the cumulative value c supplied from the cumulative addition unit 206 to the aforementioned initial power value. Thereafter, the addition unit 207 supplies the calculated transmit power value h to the RF unit 11. Further, the addition unit 207 also supplies the transmit power value, which is to be supplied to the RF unit 11, to the transmit power control value adjusting unit 202.

In FIG. 5, the determination segment setting unit 201 is used as an example of the determination segment setting unit 10a, the cumulative addition unit 206 is used as an example of the accumulation unit 10b, the detection reference setting unit 203 is used as an example of the reference value setting unit 10c, the distance change detecting unit 204 is used as an example of the distance change detecting unit 10d, and the transmit power control value adjusting unit 202 is used as an example of the variation amount adjusting unit 10e.

<Flowchart of Transmit Power Control>

Figure 7:
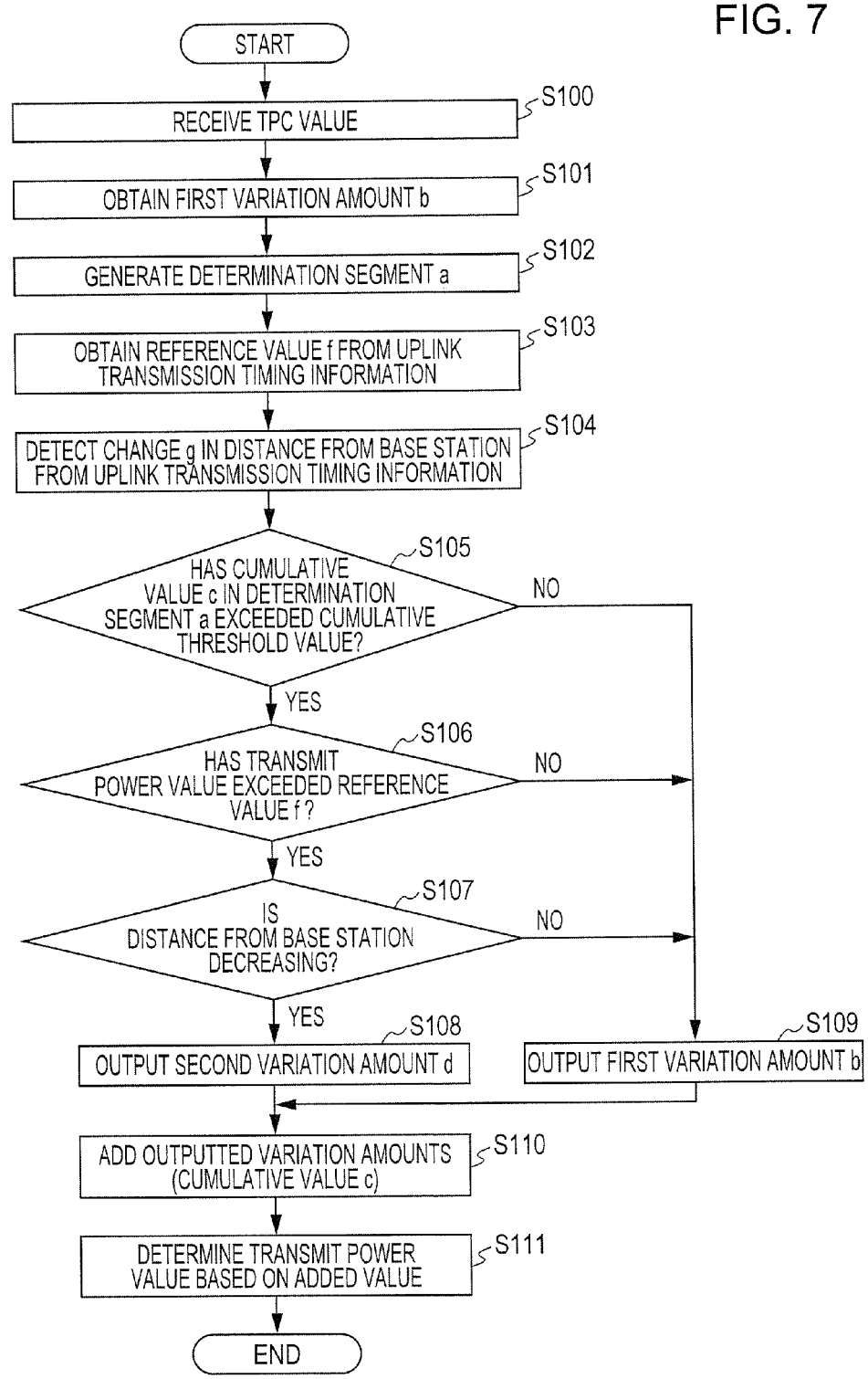
FIG. 7 is a diagram illustrating an example of an operational flowchart for transmit power control processing, according to an embodiment.

FIG. 7 is a diagram illustrating an example of an operational flowchart for transmit power control processing, according to an embodiment. FIG. 7 illustrates transmit power control processing carried out by a transmit power control unit 200. With reference to FIG. 7, in step S100, the TPC value conversion unit 205 extracts a TPC value from a transmit power control command that is inputted from the demodulator unit 122 in each sub-frame. In step S101, the TPC value conversion unit 205 converts the TPC value into a first variation amount b by which to vary transmit power as requested by the base station 20.

Then, in step S102, the determination segment setting unit 201 generates a determination segment a. In step S103, the detection reference setting unit 203 obtains a reference value f from uplink transmission timing information. In step S104, the distance change detecting unit 204 detects distance change information g by monitoring a change in the uplink transmission timing information.

Thereafter, in step S105, the transmit power control value adjusting unit 202 determines whether or not a cumulative value c of a variation amount supplied from the cumulative addition unit 206 has exceeded a pre-set cumulative threshold value e. When the cumulative value c is greater than the cumulative threshold value e (Yes, in step S105), the processing proceeds to step S106, and when the cumulative value c is equal to or less than the cumulative threshold value e (No, in step S105), the processing proceeds to step S109.

In step S106, the transmit power control value adjusting unit 202 determines whether or not a transmit power value h supplied from the addition unit 207 has exceeded the reference value f set by the detection reference setting unit 203. When the transmit power value h is greater than the reference value f (Yes, in step S106), the processing proceeds to step S107, and when the transmit power value h is equal to or less than the reference value f (No, in step S106), the processing proceeds to step S109.

In step S107, the transmit power control value adjusting unit 202 determines whether or not the distance change information g set by the distance change detecting unit 204 indicates that the distance from the base station 20 is decreasing. When the distance is decreasing (Yes, in step S107), the processing proceeds to step S108, and when the distance is not decreasing (No, in step S107), the processing proceeds to step S109.

In step S108, the transmit power control value adjusting unit 202 supplies a second variation amount d that is smaller than any first variation amount b to be specified by the base station 20, to the cumulative addition unit 206, and then the processing proceeds to step S110. Meanwhile, in step S109, the transmit power control value adjusting unit 202 supplies the first variation amount b by which to vary the transmit power as requested by the base station 20, to the cumulative addition unit 206, and then the processing proceeds to step S110.

In step S110, the cumulative addition unit 206 adds the first variation amount b or the second variation amount d to the cumulative value c that has been outputted in a previous sub-frame. In step S111, the addition unit 207 adds the cumulative value c from the cumulative addition unit 206 to the initial power value to determine the transmit power value to be actually outputted.

<Adjustment of Transmit Power>

Figure 8:
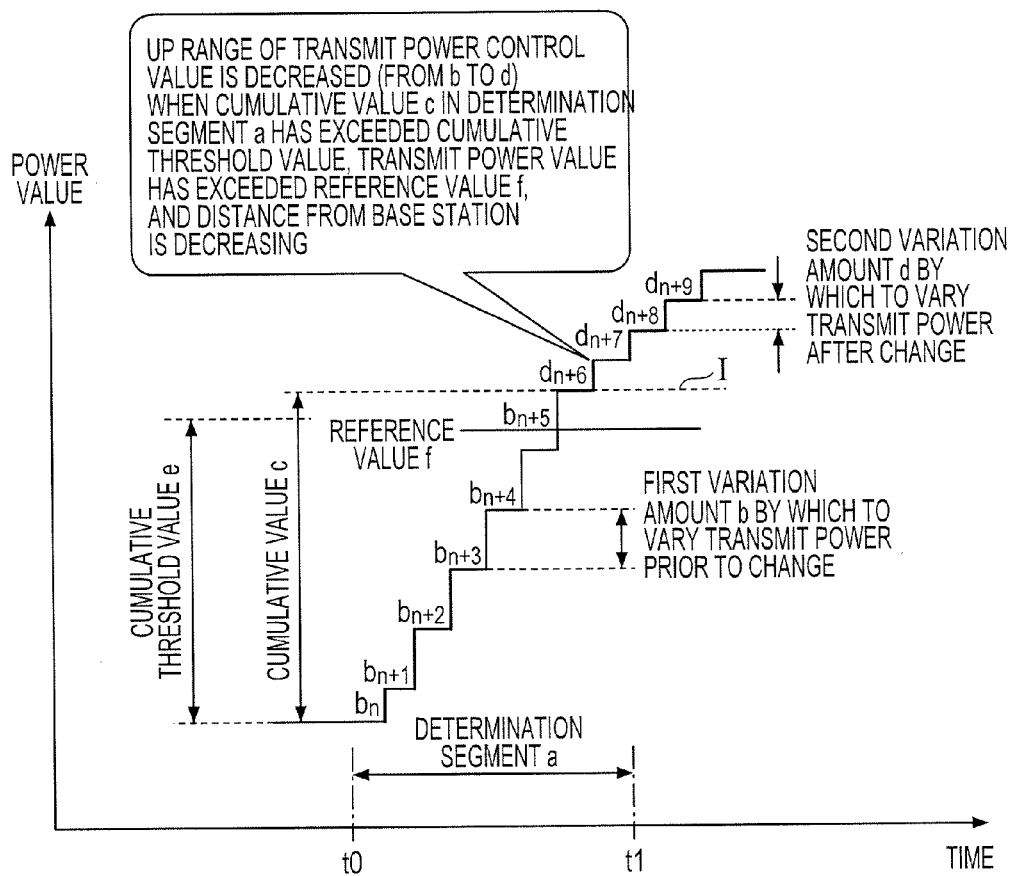
FIG. 8 is a schematic diagram illustrating an example of a transmit power adjustment, according to an embodiment.

FIG. 8 is a schematic diagram illustrating an example of a transmit power adjustment, according to an embodiment. In FIG. 8, the transmit power value is plotted on the vertical axis and time on the horizontal axis. The determination segment a that ranges from a time t0 to a time t1 is set by the determination segment setting unit 201. In the determination segment a, first variation amounts $b_n$, $b_{n+1}$, ..., $b_{n+5}$, $b_{n+6}$, and $b_{n+7}$ by which to vary the transmit power are designated by the base station 20. The transmit power control value adjusting unit 202 compares a cumulative value c of the first variation amounts $b_n$ to $b_{n+5}$ by with the cumulative threshold value e to determine that the cumulative value c is greater than the cumulative threshold value e.

In addition, the transmit power control value adjusting unit 202 detects excessive transmit power control when the transmit power control value adjusting unit 202 determines that the transmit power value h has exceeded the reference value f set by the detection reference setting unit 203 and that a change in the distance from the base station 20 set by the distance change detecting unit 204 indicates that the distance is decreasing. The transmit power control value adjusting unit 202 then decreases transmit power to be outputted, from the first variation amounts $b_{n+6}$ and $b_{n+7}$ of the excessive transmit power control to second variation amounts $d_{n+6}$ and $d_{n+7}$, and carries out the transmit power control using the decreased second variation amounts $d_{n+6}$ and $d_{n+7}$ by which to actually vary the transmit power.

Here, with a method in which the first variation amount b by which to vary the transmit power as requested by the base station 20 is masked, that is, the first variation amount b is set to 0 when excessive transmit power control is detected, the transmit power becomes the value indicated by a broken line I in FIG. 8, disabling the transmit power control from being performed finely.

Figure 9A:
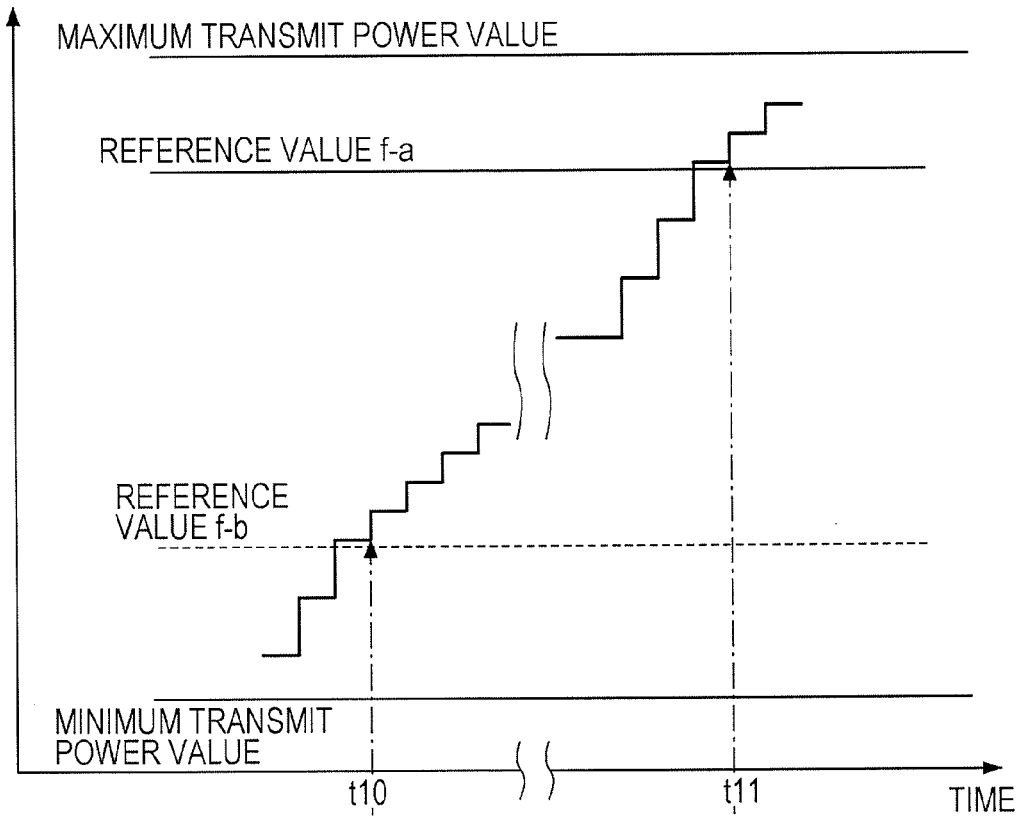
FIGS. 9A and 9B are schematic diagrams illustrating an example of a transmit power adjustment, according to an embodiment.
Figure 9B:
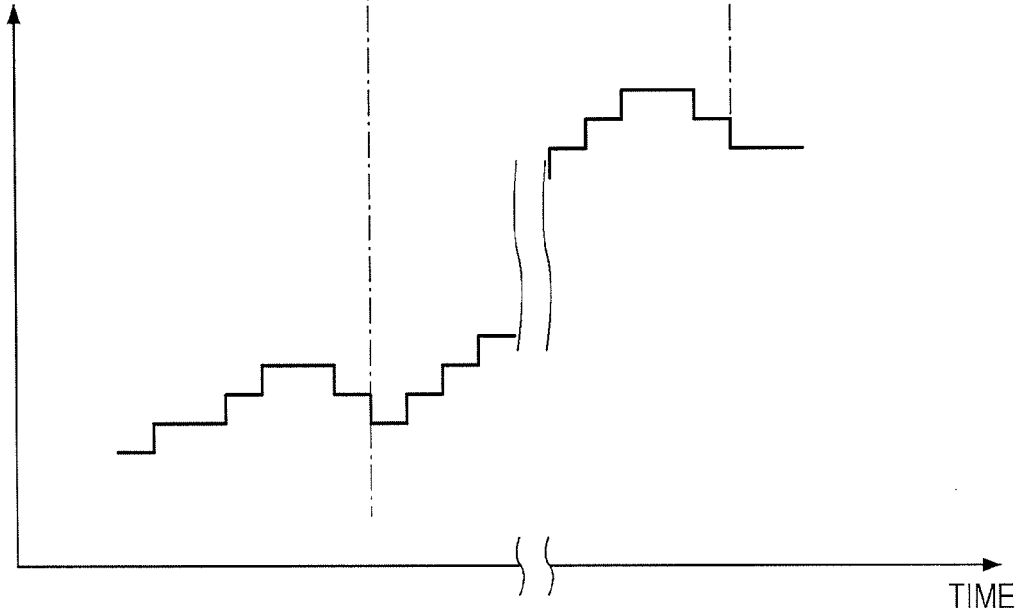

FIGS. 9A and 9B are schematic diagrams illustrating an example of a transmit power adjustment, according to an embodiment. In FIG. 9A, the transmit power value is plotted on the vertical axis and time on the horizontal axis. In FIG. 9B, the TA value is plotted on the vertical axis and time on the horizontal axis. Within a range between the maximum transmit power value and the minimum transmit power value for transmission from the mobile communication terminal apparatus 10, it is expected that the greater the distance from the base station 20 is, the higher the transmit power value is.

Accordingly, as illustrated in FIG. 9A, when the distance from the base station 20 is small, the reference value f is set to a lower transmit power side as in a reference value f−b, and a change in the distance from the base station 20 is detected using the reference value table in order to make a determination regarding excessive transmit power control. At a time t10, at which the cumulative value of the first variation amounts by which to vary the transmit power as requested by the base station 20 has exceeded the reference value f−b, FIG. 9B indicates that the distance from the base station 20 is decreasing.

When the distance from the base station 20 is large, the reference value f is set at reference value f−a on the higher transmit power side, and a change in the distance from the base station 20 is detected using the reference value table so as to make a determination regarding excessive transmit power control. At a time t11, at which the cumulative value of the first variation amounts by which to vary the transmit power as requested by the base station 20 has exceeded the reference value f−a, FIG. 9B indicates that the distance from the base station 20 is decreasing.

As described above, when dealing with excessive transmit power control from the base station 20, the reference for detecting the excessive transmit power control is adjusted in accordance with the uplink transmission timing information, and the presence/absence of the detection of the excessive transmit power control is determined by detecting a change in the distance from the base station 20. Then, an abnormal transmit power control being instructed within a given unit time is detected, and such abnormal transmit power control is processed by decreasing the variation amount by which to vary the transmit power to be outputted. Thus, the excessive transmit power control may be suppressed, thereby suppressing an increase in consumed power at the mobile station terminal or interference with another mobile station at the base station side.

<Hardware Configuration of Portable Telephone>

Figure 10:
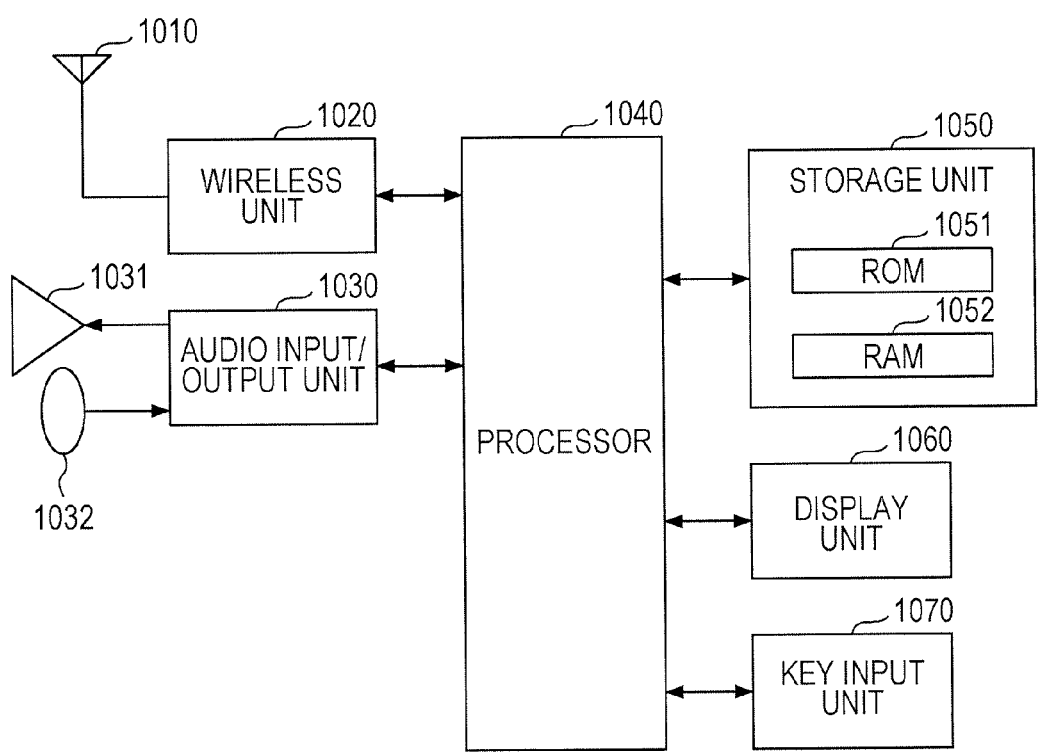
FIG. 10 is a diagram illustrating an example of a hardware configuration of a mobile communication terminal apparatus, according to an embodiment.

FIG. 10 is a diagram illustrating an example of a hardware configuration of a mobile communication terminal apparatus, according to an embodiment. With reference to FIG. 10, a portable telephone serving as the mobile communication terminal apparatus 10 includes an antenna 1010, a wireless unit 1020, an audio input/output unit 1030, a speaker 1031, a microphone 1032, a processor 1040, a storage device 1050, a display unit 1060, and a key input unit 1070.

Each of the wireless unit 1020, the audio input/output unit 1030, the storage device 1050, the display unit 1060, and the key input unit 1070 is connected to the processor 1040. The antenna 1010 is connected to the wireless unit 1020. The speaker 1031 and the microphone 1032 are connected to the audio input/output unit 1030.

The wireless unit 1020 communicates with another wireless communication device using a mobile communication network via the antenna 1010. For example, the function of the RF unit 11 illustrated in FIG. 4 is realized with the wireless unit 1020 and the processor 1040.

The display unit 1060 is a video image display screen such as an LCD. The key input unit 1070 is a keypad or the like. An operator operates the key input unit 1070 to input characters, execution commands, and so on.

The audio input/output unit 1030, for example, outputs a sound transmitted from another party on the line through the speaker 1031 during a telephone call. In addition, the audio input/output unit 1030, for example, accepts an input of a sound from the operator through the microphone 1032.

The storage device 1050 includes a read-only memory (ROM) 1051 and a random-access memory (RAM) 1052.

The processor 1040 and the storage device 1050, for example, realize the functions of the searcher unit 121, the demodulator unit 122, the decoder unit 123, the coder unit 124, the modulator unit 125, and the transmit power control unit 200 as illustrated in FIG. 4. For example, the ROM 1051 stores various programs for realizing the processing by each unit of the transmit power control unit 200 illustrated in FIG. 5. The processor 1040 and the RAM 1052 load and execute these programs to generate processes that realize the functions described above.

According to the embodiments, in transmit power control in a mobile communication terminal apparatus in a mobile communication system, when dealing with excessive transmit power control from the base station, the reference value for detecting the excessive transmit power control is adjusted in accordance with the uplink transmission timing information, and a determination regarding the excessive transmit power control is made by detecting a change in the distance from the base station. Then, abnormal transmit power control being designated within a given unit time is detected, and such an abnormal transmit power control is processed by decreasing the variation amount by which to vary the transmit power control value. Accordingly, the excessive transmit power control may be suppressed, which makes it possible to suppress an increase in consumed power at the mobile communication terminal apparatus, interference with another mobile station at the base station side, and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication terminal in a mobile communication system, the mobile communication terminal comprising:
a variation amount adjusting unit configured to:
obtain a first variation amount by which to vary uplink transmit power as requested by a base station, based on a command issued from the base station; and
control the uplink transmit power using the first variation amount or a second variation amount, the second variation amount being smaller in value than the first variation amount; and a distance change detecting unit configured to detect a change in a distance between the mobile communication terminal and the base station, based on uplink transmission timing information, wherein:
the variation amount adjusting unit is further configured to determine an excessive transmit power control when: (i) a cumulative value of first variation amounts during a predetermined time period exceeds a threshold value, the first variation amounts each corresponding to a transmit power control (TPC) value, (ii) an uplink transmit power value exceeds a reference value for the uplink transmit power, the reference value being corresponding to a timing adjustment (TA) value; and (iii) when the detected change in the distance indicates that the distance between the mobile communication terminal and the base station is decreasing, and
the variation amount adjusting unit is further configured to use the second variation amount for uplink transmit power control, when the excessive transmit power control is determined.

2. The mobile communication terminal of claim 1, further comprising:
a reference value setting unit configured to
receive, from the base station, uplink transmission timing information including the timing adjustment value for controlling a transmission timing of an uplink transmission signal.

3. The mobile communication terminal of claim 1, further comprising:
a determination segment setting unit configured to set a determination segment of the predetermined time period; and
an accumulation unit configured to obtain accumulated uplink transmit power by accumulating the first variation amounts within the determination segment.

4. A method performed by a mobile communication terminal in a mobile communication system, the method comprising:
obtaining a first variation amount by which to vary uplink transmit power as requested by a base station, based on a command issued from the base station;
controlling the uplink transmit power using the first variation amount or a second variation amount, the second variation amount being smaller in value than the first variation amount;
setting a reference value for the uplink transmit power, the reference value being corresponding to a timing adjustment (TA) value based on uplink transmission timing information received from the base station;
detecting a change in a distance between the mobile communication terminal apparatus and the base station, based on the timing adjustment value; and
determining an excessive transmit power control when: (i) a cumulative value of first variation amounts during a predetermined time period exceeds a threshold value, the first variation amounts each corresponding to a transmit power control (TPC) value, (ii) an uplink transmit power value exceeds the reference value for the uplink transmit power, and (iii) when the detected change in the distance indicates that the distance between the mobile communication terminal and the base station is decreasing; and
using the second variation amount for uplink transmit power control, when the excessive transmit power control is determined.

5. The method of claim 4, further comprising:
receiving, from the base station, the timing adjustment value in the uplink transmission timing information for controlling a transmission timing of an uplink transmission signal.

6. The method of claim 4, further comprising:
obtaining accumulated uplink transmit power by accumulating the first variation amounts within a determination segment of the predetermined time period.

7. A terminal apparatus in a mobile communication system, the terminal apparatus comprising:
a memory; and
at least one processor coupled to the memory and configured to:
acquire a first variation amount by which to vary uplink transmit power of the terminal apparatus as requested by a base station, based on a command issued from the base station;
control the uplink transmit power using a first variation amount or a second variation amount, the second variation amount being smaller in value than the first variation amount;
detect a change in a distance between the apparatus and the base station, based on uplink transmission timing information;
set a reference value corresponding to a timing adjustment (TA) value based on the uplink transmission timing information;
determine an excessive transmit power control when: (i) a cumulative value of first variation amounts during a predetermined time period exceeds a threshold value, the first variation amounts each being corresponding to a transmit power control (TPC) value, (ii) an uplink transmit power value exceeds the reference value for the uplink transmit power, and (iii) when the detected change in the distance indicates that the distance between the terminal apparatus and the base station is decreasing; and
use the second variation amount for uplink transmit power control, when the excessive transmit power control is determined.

8. The apparatus of claim 7, wherein the at least one processor is further configured to
receive, from the base station, the uplink transmission timing information for controlling a transmission timing of an uplink transmission signal by the apparatus.

9. The apparatus of claim 7, wherein the at least one processor is further configured to
set a determination segment of the predetermined time period.

10. The mobile communication terminal of claim 1, wherein the reference value is set in accordance with the distance between the mobile communication terminal and the base station.

11. The mobile communication terminal of claim 10, wherein a decrease in the reference value corresponds to a decrease in the distance between the mobile communication teiminal and the base station.

12. The mobile communication terminal of claim 1, wherein the second variation amount is set to a value corresponding to a predetermined ratio of the first variation amount.

* * * * *